(12) United States Patent
Hein

(10) Patent No.: US 10,751,971 B1
(45) Date of Patent: Aug. 25, 2020

(54) EDGE DAMAGE TOLERANT HEATED AND UNHEATED COMPOSITE PANELS WITH ROTATED HONEYCOMB EDGE PIECES

(71) Applicant: GOODRICH CORPORATION, Charlotte, NC (US)

(72) Inventor: Brandon Hein, Stow, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/389,219

(22) Filed: Apr. 19, 2019

(51) Int. Cl.
*B32B 3/12* (2006.01)
*E04C 2/36* (2006.01)
*B32B 5/24* (2006.01)

(52) U.S. Cl.
CPC ............... *B32B 3/12* (2013.01); *B32B 5/24* (2013.01); *E04C 2/365* (2013.01); *B32B 2250/40* (2013.01)

(58) Field of Classification Search
CPC ......... B32B 3/12; B32B 5/24; B32B 2250/40; B32B 2605/18; Y10T 428/24149; Y10T 428/236; Y10T 428/24157; E04C 2/365
USPC ........................................................ 428/116
See application file for complete search history.

(56) References Cited

U.S. PATENT DOCUMENTS

| 2,744,042 A * | 5/1956 | Pace .................. B29D 99/0089 264/46.5 |
| 3,703,422 A * | 11/1972 | Yoshino ................ B29C 70/086 156/87 |
| 4,273,818 A * | 6/1981 | Buchs .................. B29D 24/005 428/116 |
| 4,335,174 A * | 6/1982 | Belko ................. B29C 63/0034 428/73 |
| 4,617,217 A * | 10/1986 | Michaud-Soret ....... B29C 70/08 428/117 |
| 4,743,740 A * | 5/1988 | Adee ...................... B64D 15/00 156/273.9 |
| 5,006,391 A * | 4/1991 | Biersach .................. B32B 3/12 428/116 |
| 5,034,256 A * | 7/1991 | Santiso, III ............... B32B 3/02 428/73 |
| 5,445,861 A * | 8/1995 | Newton .................... B32B 3/12 428/116 |
| 5,649,721 A * | 7/1997 | Stafford .................. B60R 21/04 244/118.5 |
| 5,834,082 A | 11/1998 | Day |
| 6,837,171 B1 * | 1/2005 | Clark ................... A47B 13/086 108/131 |
| 7,048,986 B2 * | 5/2006 | Shah ........................ B32B 3/12 428/117 |
| 7,581,366 B2 * | 9/2009 | Smith ....................... B32B 3/12 52/794.1 |
| 8,017,212 B2 * | 9/2011 | Leng ........................ B32B 3/12 428/73 |
| 8,383,231 B2 * | 2/2013 | Horigome ................. B32B 3/12 428/116 |

(Continued)

Primary Examiner — Brent W Herring
(74) Attorney, Agent, or Firm — Snell & Wilmer LLP

(57) ABSTRACT

A panel assembly for use in an aircraft includes a surface. The panel assembly further includes a body portion including a honeycomb material having multiple body volumes oriented perpendicular to the surface. The panel assembly further includes an edge portion extending around an edge of the panel assembly and including the honeycomb material having multiple edge volumes oriented parallel to the surface in order to increase edge strength of the panel assembly.

18 Claims, 3 Drawing Sheets

(56) References Cited

U.S. PATENT DOCUMENTS

| | | | | |
|---|---|---|---|---|
| 8,709,584 | B2* | 4/2014 | Carstensen | B64D 9/003 |
| | | | | 244/133 |
| 8,748,784 | B2* | 6/2014 | Bauer | H05B 6/06 |
| | | | | 219/635 |
| 9,518,509 | B2 | 12/2016 | Desjoyeaux et al. | |
| 9,643,378 | B2 | 5/2017 | Ho | |
| 2004/0253407 | A1* | 12/2004 | Shah | B32B 3/12 |
| | | | | 428/73 |
| 2007/0054087 | A1* | 3/2007 | Smith | B32B 3/12 |
| | | | | 428/116 |
| 2007/0101679 | A1* | 5/2007 | Harthcock | B60R 13/08 |
| | | | | 52/782.1 |
| 2007/0193146 | A1* | 8/2007 | Carstensen | B64D 9/003 |
| | | | | 52/268 |
| 2008/0182067 | A1* | 7/2008 | Shen | E04C 2/365 |
| | | | | 428/117 |
| 2009/0072086 | A1* | 3/2009 | Smith | B32B 3/12 |
| | | | | 244/119 |
| 2009/0202785 | A1* | 8/2009 | Meyer Zu Drewer | |
| | | | | E04C 2/365 |
| | | | | 428/192 |
| 2010/0035018 | A1* | 2/2010 | Horigome | B32B 3/12 |
| | | | | 428/116 |
| 2010/0112265 | A1* | 5/2010 | Leng | E04C 2/365 |
| | | | | 428/53 |
| 2011/0039060 | A1* | 2/2011 | Shen | B32B 27/04 |
| | | | | 428/117 |
| 2012/0285947 | A1* | 11/2012 | Bauer | H05B 6/06 |
| | | | | 219/635 |
| 2017/0238369 | A1* | 8/2017 | Owens | B32B 15/20 |
| | | | | 428/116 |
| 2018/0118323 | A1* | 5/2018 | Ischdonat | B32B 37/14 |

* cited by examiner

EDGE DAMAGE TOLERANT HEATED AND UNHEATED COMPOSITE PANELS WITH ROTATED HONEYCOMB EDGE PIECES

FIELD

The present disclosure relates to decorative and structural composite panel assemblies and, more specifically, to a composite panel assembly designed to have increased compression strength around its edges.

BACKGROUND

Current panel assemblies may include a honeycomb core that is oriented in such a manner as to provide the greatest strength in a direction perpendicular to the surface of the panel. This is desirable to maximize shear strength and stiffness of the panel as well as to reduce the likelihood of damage to the panel assembly in response to such activities as walking on a panel assembly, objects being dropped on a panel assembly, or the like. However, during installation, the edges of such panels may become damaged by contact between an edge of the panel and a foreign object. Such damage may occur due to the alignment of the honeycomb material within the core being set to provide the greatest structural integrity in the direction perpendicular to the surface.

SUMMARY

Disclosed herein is a panel assembly for use in an aircraft. The panel assembly includes a surface. The panel assembly further includes a body portion including a honeycomb material having multiple body volumes oriented perpendicular to the surface. The panel assembly further includes an edge portion extending around an edge of the panel assembly and including the honeycomb material having multiple edge volumes oriented parallel to the surface.

Any of the foregoing embodiments may further include a core filler located in the multiple edge volumes and at least one of the multiple body volumes.

In any of the foregoing embodiments, the core filler extends for a maximum of 6 inches from the edge of the panel assembly.

In any of the foregoing embodiments, the core filler includes at least one of an epoxy, a phenolic resin, a polymer resin, or a syntactic variety thereof.

In any of the foregoing embodiments, the core filler bonds the edge portion to the body portion.

Any of the foregoing embodiments may further include structural plies located on the surface of the panel assembly.

In any of the foregoing embodiments, the structural plies include a reinforced polymer.

In any of the foregoing embodiments, the honeycomb material includes at least one of a para-aramid material, a meta-aramid material, titanium, carbon fiber, or aluminum.

In any of the foregoing embodiments, the edge portion extends around at least the one edge of the panel assembly.

Any of the foregoing embodiments may further include a skin, and a conductive layer configured to convert electricity into heat.

Also disclosed is a panel assembly for use in an aircraft. The panel assembly includes a surface and at least three edges. The panel assembly further includes a body portion including a honeycomb material having multiple body volumes oriented perpendicular to the surface. The panel assembly further includes an edge portion located on at least one of the at least three edges of the panel assembly and including the honeycomb material having multiple edge volumes oriented parallel to the surface.

Any of the foregoing embodiments may further include a core filler located in the multiple edge volumes and at least one of the multiple body volumes.

In any of the foregoing embodiments, the core filler extends for a maximum of 6 inches from the edge of the panel assembly.

In any of the foregoing embodiments, the core filler includes at least one of an epoxy, a phenolic resin, a polymer resin, or a syntactic variety thereof.

In any of the foregoing embodiments, the core filler bonds the edge portion to the body portion.

Any of the foregoing embodiments may further include structural plies located on the surface of the panel assembly.

In any of the foregoing embodiments, the structural plies include a reinforced polymer.

In any of the foregoing embodiments, the honeycomb material includes at least one of a para-aramid material, a meta-aramid material, titanium, carbon fiber, or aluminum.

Any of the foregoing embodiments may further include a skin, and a conductive layer configured to convert electricity into heat.

Also disclosed is a panel assembly for use in an aircraft. The panel assembly includes a surface. The panel assembly further includes a body portion including a honeycomb material having multiple body volumes oriented perpendicular to the surface. The panel assembly further includes an edge portion extending around an edge of the panel assembly and including the honeycomb material having multiple edge volumes oriented parallel to the surface in order to increase edge strength of the panel assembly. The panel assembly further includes a core filler located in the multiple edge volumes and at least some of the multiple body volumes. The panel assembly further includes structural plies located on the surface of the panel assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
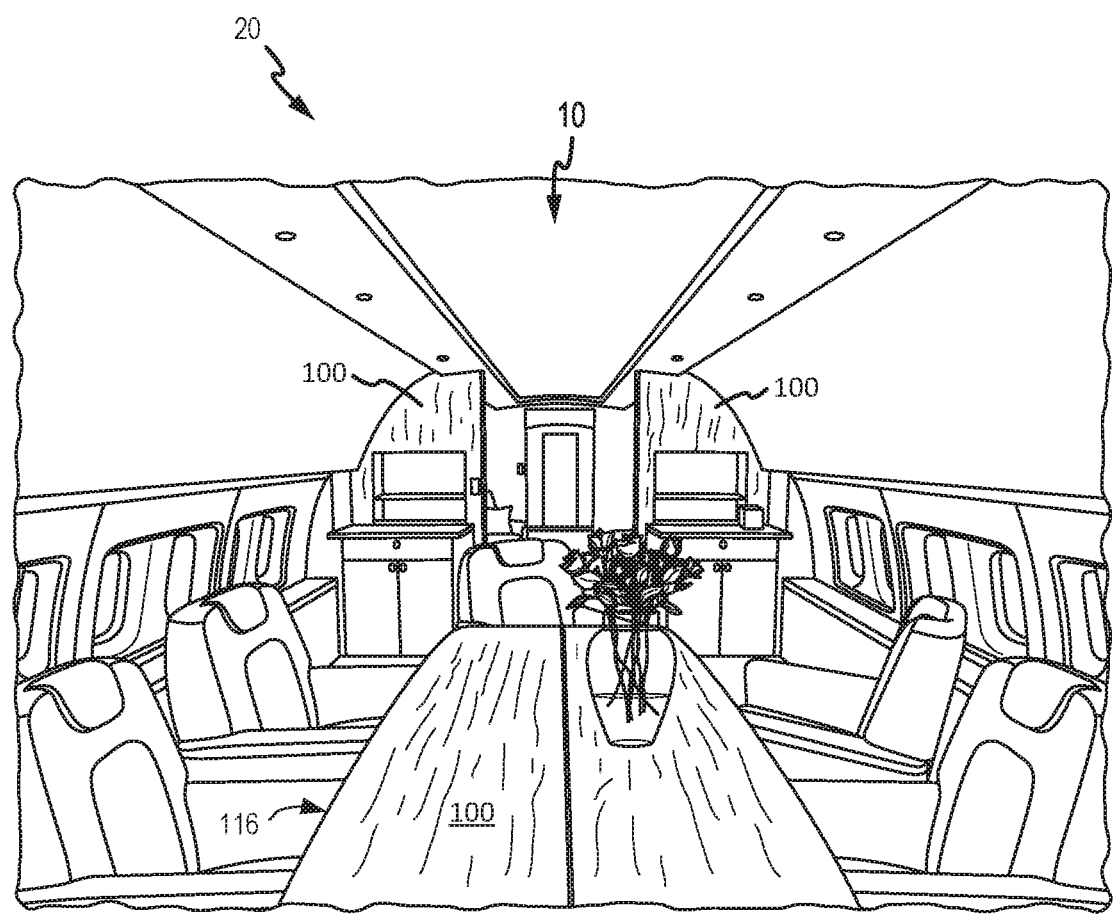
FIG. 1 illustrates an aircraft interior including various components with a panel assembly having one or more veneer panels, in accordance with various embodiments.

Referring now to FIG. 1, an aircraft interior 10 of an aircraft 20 may include multiple panel assemblies 100. Each of the panel assemblies 100 may be designed for use in the aircraft 20. For example, the panel assemblies 100 may be used to form cabinets, doors, floors, or other structures within the aircraft 20. In that regard, the panel assemblies 100 may be designed to satisfy the requirements set forth in Federal Aviation Regulations (FAR) Section 25.853. This Section sets forth that materials used in the construction of interiors of aircraft be self-extinguishing when tested vertically (i.e., exposed to flame while located in a vertical orientation). The average burn length is not to exceed 6 inches and the average flame time after removal of the flame source is not to exceed 15 seconds. Drippings from the test specimen are not to continue to flame for more than an average of 3 seconds after falling.

Figure 2:
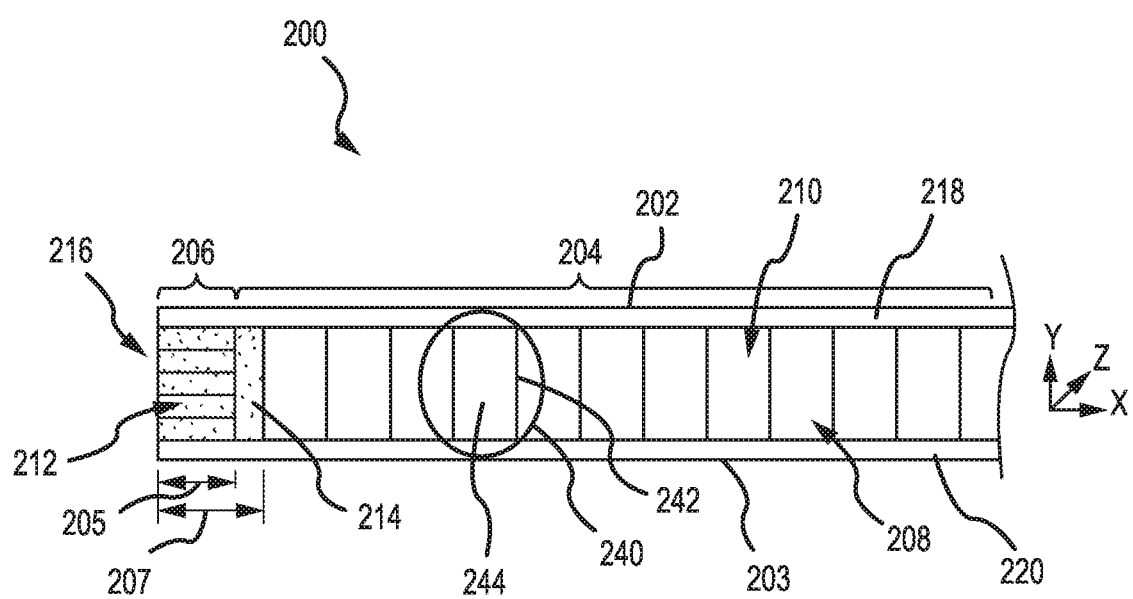
FIG. 2 illustrates a panel assembly for use in an aircraft and having increased edge structural support, in accordance with various embodiments.

Referring now to FIG. 2, a panel assembly 200, such as for use as a panel assembly 100 of FIG. 1 in an aircraft or in other situations, may include a surface 202, such as a top surface, and a surface 203, such as a bottom surface. The surface 202 may be considered an exposed surface as it may be oriented in such a way that it is exposed in response to being installed in an aircraft or other environment. The surface 203 may or may not be exposed. For example, the panel assembly 200 may be used as a floorboard and the surface 202 may be exposed and walked upon.

The panel assembly 200 may further include a body portion 204 and an edge portion 206. The body portion 204 may comprise a bulk of the panel assembly 200, and the edge portion 206 may extend along edges 216 of the panel assembly 200. For example and with a brief reference to FIG. 1, a panel 100 may include three, four, or more edges 116. Each of the edges 116 may be lined with an edge portion similar to the edge portion 206 of FIG. 2.

Returning reference to FIG. 2, the edge portion 206 may extend for a distance 205 from the edges 216. In various embodiments, the distance 205 may be less than 6 inches (15.24 centimeters (cm)) such as between 0.05 inches and 1 inch (0.127 cm and 2.54 cm), between 0.1 inches and 0.5 inches (0.254 cm and 1.27 cm), or between 0.2 inches and 0.4 inches (0.508 cm and 1.016 cm).

The body portion 204 and the edge portion 206 may each include an anisotropic material (such as a honeycomb material 208). The honeycomb material 208 may have a geometry similar to that of a natural honeycomb in order to allow minimization of a mass of material used while achieving a substrate having a relatively high compression strength. In particular, the honeycomb material 208 may include multiple cells 240 that include walls 242 defining volumes 244. The honeycomb material 208 may have a maximum compression strength in a direction parallel to the orientation of the walls.

The honeycomb material 208 of the body portion 204 may have body volumes 210 (and corresponding walls) that extend in a direction perpendicular to the surface 202. The surface 202 may extend along a X-Z plane, and the body volumes 210 may extend along a Y direction. In that regard, the body portion 204 may have a greatest compression strength along the Y direction.

The honeycomb material 208 of the edge portion 206 may have edge volumes 212 (and corresponding walls) that extend in a direction parallel to the surface 202. That is, the edge volumes 212 may extend along the X direction, thus providing greatest strength along the X direction. The edge volumes 212 may be oriented from a center of the panel assembly 200 towards the edges 216 such that the edge portion 206 includes increased structural integrity at the edges 216 relative to panel assemblies that include honeycomb all oriented in the same direction.

A core filler 214 may be inserted into the edge volumes 212 and a portion of the body volumes 210. The core filler may increase the structural integrity of the honeycomb material 208 in which it is installed and may also adhere or bond the edge portion 206 to the body portion 204. The core filler 214 may extend for a distance 207 from the edges 216. In various embodiments, the distance 207 may be the same as or greater than the distance 205. For example, the distance 207 may be between 0.05 inches and 2 inches (0.127 cm and 5.08 cm), between 0.1 inches and 0.7 inches (0.254 cm and 1.778 cm), or between 0.2 inches and 0.4 inches (0.508 cm and 1.016 cm).

The panel assembly 200 may further include structural plies 218 located on and forming the surface 202, and structural plies 220 located on and forming the surface 203. In various embodiments, the structural plies 218, 220 may wrap around the edges 216. The structural plies 218, 220 may cover the body volumes 210 and the edge volumes 212 and may further increase the structural integrity of the panel assembly.

In various embodiments, the honeycomb material 208 may include one or more of a meta-aramid material (e.g., that sold under the mark NOMEX), a para-aramid material (e.g., that sold under the mark KEVLAR), an aluminum or aluminum alloy, titanium or titanium alloy, carbon fiber, or the like. In various embodiments, the structural plies 218, 220 may include a reinforced polymer such as a carbon fiber material, a fiberglass material, or the like. For example, the structural plies 218, 220 may include carbon fiber or fiberglass fabric impregnated with a resin system such as a thermoplastic (polyether ether ketone, polycarbonate, polyphenylene sulfide, polyetherimide) or a thermoset (epoxy, phenolic, benzoxazine). In various embodiments, the core filler 214 may include at least one of an epoxy, a phenolic resin, a polymer resin, or a syntactic variety thereof. For example, the epoxy resin may be inserted into the body volumes 210 and the edge volumes then cured to harden the epoxy resin.

Figure 3:
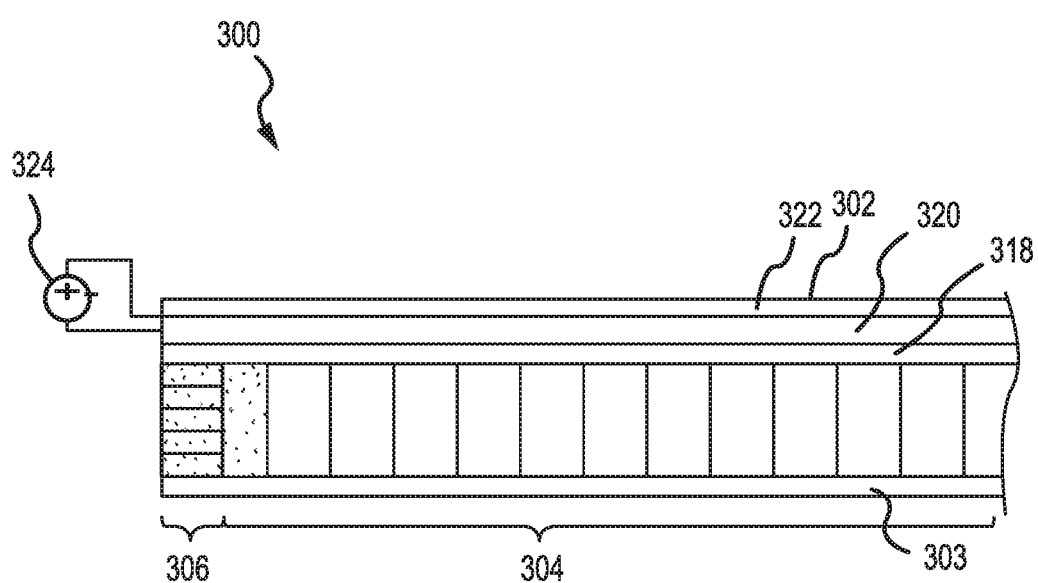
FIG. 3 illustrates a panel assembly for use in an aircraft and having increased edge structural support and heating elements, in accordance with various embodiments.

Referring now to FIG. 3, another panel assembly 300 may include similar features as the panel assembly 200 of FIG. 2 but may be designed to be a heated panel. In that regard, the panel assembly 300 may have a heated surface 302 and a non-heated surface 303. The panel assembly 300 may further include a body portion 304, an edge portion 306, and structural plies 318 that are identical to the body portion 204, the edge portion 206, and the structural plies 218 of FIG. 2.

A conductive layer 320 may be installed on the outer surface of the structural plies 318 and may include any conductive material such as silver, copper, gold, aluminum, a conductive ink, or the like. A power source 324, such as a battery or generator, may be coupled to the conductive layer 320 and may provide electrical energy to the conductive layer 320. The conductive layer 320 may dissipate the electrical energy as heat, thus heating the panel assembly 300. In various embodiments, a skin 322 may be installed on the outer surface of the conductive layer 320 and may seal or otherwise protect the conductive layer 320. For example, the skin 322 may be non-conductive and may include the same or different materials than the structural plies 318.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A panel assembly for use in an aircraft, the panel assembly comprising:
    a surface;
    a body portion including a honeycomb material having multiple body volumes oriented perpendicular to the surface;
    an edge portion extending around an edge of the panel assembly and including the honeycomb material having multiple edge volumes oriented parallel to the surface; and
    a core filler located in the multiple edge volumes and at least one of the multiple body volumes such that the core filler entirely fills the multiple edge volumes.

2. The panel assembly of claim 1, wherein the core filler extends for a maximum of 6 inches from the edge of the panel assembly.

3. The panel assembly of claim 1, wherein the core filler includes at least one of an epoxy, a phenolic resin, a polymer resin, or a syntactic variety thereof.

4. The panel assembly of claim 1, wherein the core filler bonds the edge portion to the body portion.

5. The panel assembly of claim 1, further comprising structural plies located on the surface of the panel assembly.

6. The panel assembly of claim 5, wherein the structural plies include a reinforced polymer.

7. The panel assembly of claim 1, wherein the honeycomb material includes at least one of a para-aramid material, a meta-aramid material, titanium, carbon fiber, or aluminum.

8. The panel assembly of claim 1, wherein the edge portion extends around at least one edge of the panel assembly.

9. The panel assembly of claim 1, further comprising a skin, and a conductive layer configured to convert electricity into heat.

10. A panel assembly for use in an aircraft, the panel assembly comprising:
    a surface and at least three edges;
    a body portion including a honeycomb material having multiple body volumes oriented perpendicular to the surface;
    an edge portion located on at least one of the at least three edges of the panel assembly and including the honeycomb material having multiple edge volumes oriented parallel to the surface; and
    a core filler located in the multiple edge volumes and at least one of the multiple body volumes such that the core filler entirely fills the multiple edge volumes.

11. The panel assembly of claim 10, wherein the core filler extends for a maximum of 6 inches from the edge of the panel assembly.

12. The panel assembly of claim 10, wherein the core filler includes at least one of an epoxy, a phenolic resin, a polymer resin, or a syntactic variety thereof.

13. The panel assembly of claim 10, wherein the core filler bonds the edge portion to the body portion.

14. The panel assembly of claim 10, further comprising structural plies located on the surface of the panel assembly.

15. The panel assembly of claim 14, wherein the structural plies include a reinforced polymer.

16. The panel assembly of claim 10, wherein the honeycomb material includes at least one of a para-aramid material, a meta-aramid material, titanium, carbon fiber, or aluminum.

17. The panel assembly of claim 10, further comprising a skin, and a conductive layer configured to convert electricity into heat.

18. A panel assembly for use in an aircraft, the panel assembly comprising:
- a surface;
- a body portion including a honeycomb material having multiple body volumes oriented perpendicular to the surface;
- an edge portion extending around an edge of the panel assembly and including the honeycomb material having multiple edge volumes oriented parallel to the surface in order to increase edge strength of the panel assembly;
- a core filler located in the multiple edge volumes and at least some of the multiple body volumes such that the core filler entirely fills the multiple edge volumes; and
- structural plies located on the surface of the panel assembly.

\* \* \* \* \*